(12) United States Patent
Nandagopal

(10) Patent No.: US 9,007,901 B2
(45) Date of Patent: Apr. 14, 2015

(54) METHOD AND APPARATUS PROVIDING FLOW CONTROL USING ON-OFF SIGNALS IN HIGH DELAY NETWORKS

(75) Inventor: Thyagarajan Nandagopal, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 128 days.

(21) Appl. No.: 13/369,551

(22) Filed: Feb. 9, 2012

(65) Prior Publication Data

US 2013/0208593 A1    Aug. 15, 2013

(51) Int. Cl.
*H04L 1/00* (2006.01)
*H04L 12/70* (2013.01)
*H04L 12/825* (2013.01)
*H04L 12/841* (2013.01)
*H04L 12/835* (2013.01)
*H04L 12/863* (2013.01)

(52) U.S. Cl.
CPC ............. *H04L 47/00* (2013.01); *H04L 47/266* (2013.01); *H04L 47/283* (2013.01); *H04L 47/30* (2013.01); *H04L 47/621* (2013.01)

(58) Field of Classification Search
USPC ................... 370/229–240, 412–430
See application file for complete search history.

(56) References Cited

U.S. PATENT DOCUMENTS

| | | |
|---|---|---|
| 6,256,674 B1 * | 7/2001 | Manning et al. .............. 709/232 |
| 2003/0035373 A1 * | 2/2003 | Bass et al. .................. 370/230.1 |
| 2004/0057543 A1 * | 3/2004 | Huijgen et al. ............... 375/356 |
| 2004/0096222 A1 * | 5/2004 | Cagenius ...................... 398/115 |
| 2005/0147033 A1 * | 7/2005 | Chin et al. .................... 370/229 |

* cited by examiner

*Primary Examiner* — Ricky Ngo
*Assistant Examiner* — Wei-Po Kao
(74) *Attorney, Agent, or Firm* — Wall & Tong LLP

(57) ABSTRACT

A method and apparatus controlling, either individually or in the aggregate, traffic flows associated with a plurality of queues by transmitting traffic source FlowON messages at first times selected to avoid queue underflow conditions, and traffic source FlowOFF message at second times selected to avoid queue overflow conditions, where the first and second times are determined as a function of delay time D of a link supporting the traffic source.

19 Claims, 6 Drawing Sheets

```
N = number of active per-flow queues at BS
E = 0.05
set Qi' = (1-E) * Qi
Keep a list of OFF_times (t_OFF_i) for each primary queue i
While (true), repeat
    T = current_time
    m = number of primary queues
    M = set of primary queues
    For each non-primary queue i
        If the active queue size i is below the ON threshold,
            Then enable queue i as primary queue
            Queue i sends out a FlowON message
            m = m+1;  Add i to the set M.
            Compute t_OFF_i = T + (Qi' + D*Ri)/(B/m – Ri)
            Add t_OFF_i to OFF_times list
            Update_Timers(M - i)
            continue
If an OFF time expires from the OFF_times list,
        Then,
        i = identity of expiring primary queue
        Check if queue i has reached the OFF threshold
        If the OFF threshold of queue i is reached
            Then send FlowOFF message for queue i
            m = m – 1; Remove queue i from set M.
            Remove queue i timer from OFF_times list
            Update_Timers(M)
            Continue
        Else
            Update drainage rate Ri of all primary queues
            Update_Timers(M)
            Continue
If PGW closes a PDP context for primary queue i
        Then m=m-1; Remove queue i from set M
        Update_Timers(M)
        Continue
End While Function Update_Timers(M)
For each primary queue, i, in the set M
    Set t_OFF_i = T + Qi'/(B/m – Ri) – D
End
```

```
N = number of active per-flow queues at BS
E = 0.05
While (true), repeat
    T = current_time
    m = number of primary queues
    M = set of primary queues
    For each non-primary queue i
        If the active queue size i is below the ON threshold
            Then enable queue i as primary queue
            Queue i sends out a FlowON message
            m = m+1;  Add i to the set M.
            continue Check if queue i has reached the OFF threshold
        If the OFF threshold of queue i is reached
            Then send FlowOFF message for queue i
            m = m − 1; Remove queue i from set M.
            Continue
        Else
            Update drainage rate Ri of all primary queues
            Continue If PGW closes a PDP context for primary queue i
            Then m=m-1; Remove queue i from set M
            Continue
End While
```

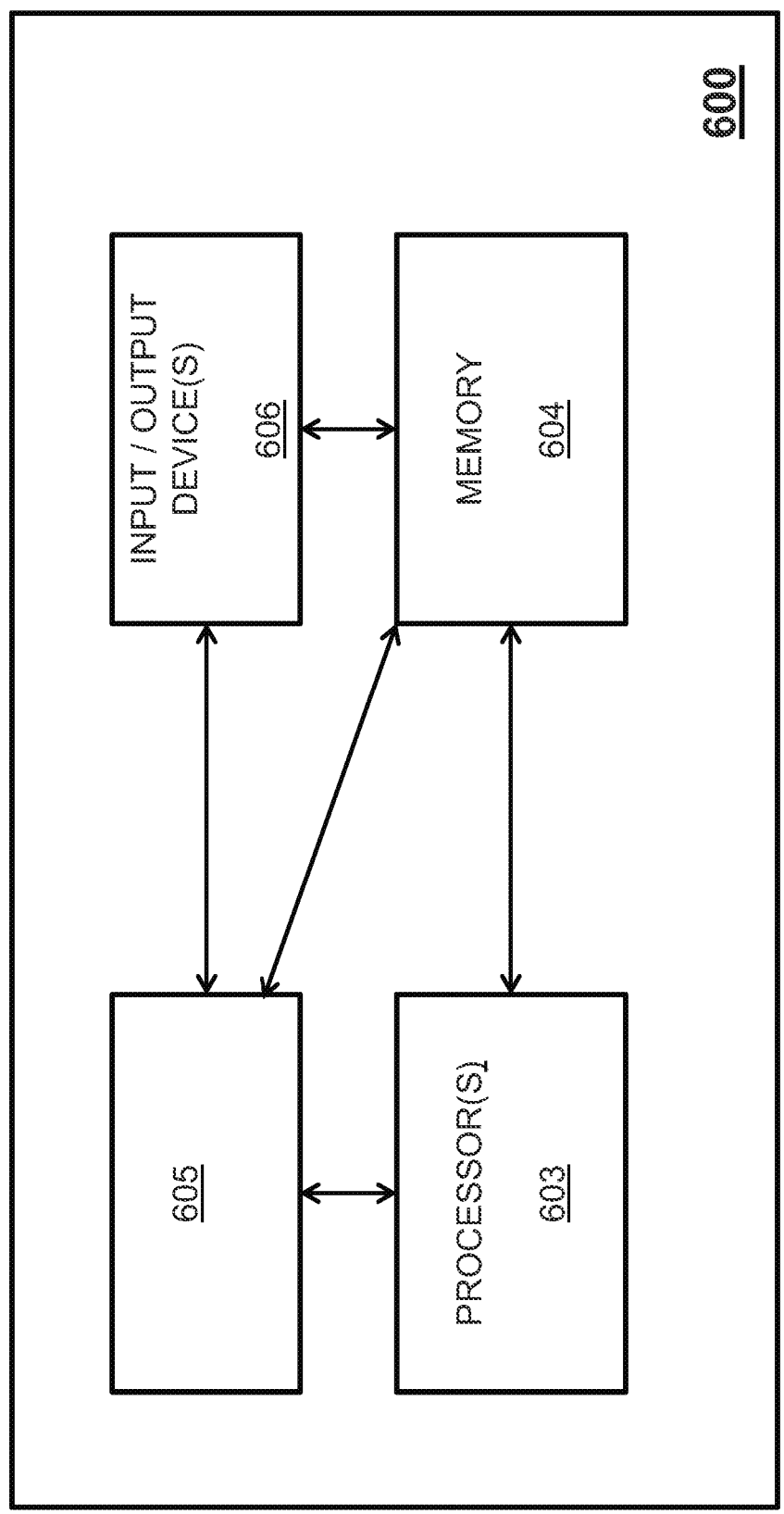

METHOD AND APPARATUS PROVIDING FLOW CONTROL USING ON-OFF SIGNALS IN HIGH DELAY NETWORKS

FIELD OF THE INVENTION

The invention relates to the field of communication networks and, more specifically, to traffic management in such networks using granular policing.

BACKGROUND OF THE INVENTION

Flow control techniques are used to prevent loss of packets in a network due to buffer overflows. Sophisticated flow control algorithms use a 'send-me-x-packets' model that allows the sender to exactly know how many packets to send without causing problems at the receiver. However, in many wireless networks such sophisticated flow control mechanisms do not exist. Many wireless networks (as well as other networks) use a relatively primitive ON-OFF control mechanism, which unfortunately leads to buffer overflows and subsequent packet losses.

For example, within the context of a per-flow input queue at a Base Station (BS) or eNodeB, packets are provided to the queue via a Packet Gateway (PGW) or other node which takes an incoming IP packet destined for a user, applies a Packet Data Protocol (PDP) context (including security), and fragments the packet to fit the maximum size specific to the user's context.

Within the context of ON-OFF flow control, a BS transmits toward the PGW a FlowON_i message for each specific per-flow queue, i, that has less than the ON_Threshold number of packets. Once the POW receives this control packet, the PGW starts transmitting packets toward the BS corresponding to that per-flow queue, as long as such packets can be sent from its own output buffers. Similarly, the BS transmits toward the PGW a FlowOFF_i message once the number of packets in the BS per-flow queue of queue i has more than the OFF_threshold number of packets. Once the POW receives this control packet, the PGW starts transmitting packets toward the BS corresponding to that per-flow queue.

ON-OFF flow control works well when the link delay D between the PGW and the BS is close to zero. To compensate for the real world situation where the link delay is not zero, system designers must allow for sufficient buffer space Q by setting the ON_threshold to a non-zero value such as 2*D*R (where R is either the peak service rate (Rpeak) or average service rate (Rave) of the BS queue) and the OFF_threshold to a value much less than the maximum per-flow queue of Q-B*D (where Q is the buffer size and B is the bandwidth of the link) to account for the link delay D.

Disadvantageously, a high bandwidth delay product B*D will lead to a large queue sizing, since each per-flow queue has to be at least B*D packets long. Moreover, a very large per-flow queue is very undesirable in the BS, since the packets in the queue have to be coded in a way that responds to network conditions faced by the user, and a large buffer makes it non-conducive to change the packets mid-stream.

Credit-based or window-based flow control is more efficient than ON-OFF flow control. Within the context of a credit-based flow control mechanism, the BS transmits toward the PGW a control message that identifies a specific number of packets to be transmitted by the PGW toward the BS (i.e., a specific number of credits). These credits or packets may be provided by the PGW at once or in installments and, regardless of the BS-PGW link delay, system designers will be able to architect the BS with relatively small per-flow queues.

Unfortunately, credit-based flow control cannot always be implemented due to a lack of support between both end-points (e.g., PGW and BS), since both end-points of the link have to be changed to support credit-based flow control.

SUMMARY OF THE INVENTION

Various deficiencies in the prior art are addressed through the invention of a method, apparatus and system of using ON-OFF flow control to achieve a fine-grained control approximating that of a credit-based flow control scheme. Various embodiments are particularly well-suited for use within the context of high delay networks, such as wireless networks.

One embodiment comprises a method for Controlling traffic flows associated with a plurality of queues, the method comprising: for each active queue, transmitting toward a corresponding traffic source a FlowON message at first times selected to avoid a queue underflow condition; for each active queue, transmitting toward the corresponding traffic source a FlowOFF message at second times selected to avoid a queue overflow condition; the first and second times being determined as a function of delay time D of a link between the active queue and corresponding traffic source.

Other embodiments logically represent at least a portion of the plurality of queues as an aggregate queue in which each member queue contemporaneously transmits said FlowON and FlowOFF messages.

BRIEF DESCRIPTION OF THE DRAWINGS

The teachings of the present invention can be readily understood by considering the following detailed description in conjunction with the accompanying drawings, in which:

FIGS. 3-5 depict a flow diagrams of methods according to the various embodiments; and FIG. 6 depicts a high-level block diagram of a general-purpose computer suitable for use in performing the functions described herein.

To facilitate understanding, identical reference numerals have been used, where possible, to designate identical elements that are common to the figures.

DETAILED DESCRIPTION OF THE INVENTION

Embodiments of the invention will be primarily described within the context of a flow control mechanism adapted for managing per-flow input queues at a data receiver, such as at Base Station (BS) or eNodeB network elements within a 3G or 4G wireless network. However, those skilled in the art and informed by the teachings herein will realize that the various embodiments are also applicable to managing per-flow input queues associated with other types of network elements (e.g., routers, switches, buffers etc.) as well other wireless or wireline networks.

Generally speaking, various embodiments discussed herein provide a mechanism for efficiently managing multiple input buffers or input queues using time separation of ON-OFF signaling as a method of indicating a number of packets to be transmitted (i.e., a number of credits).

Figure 1:
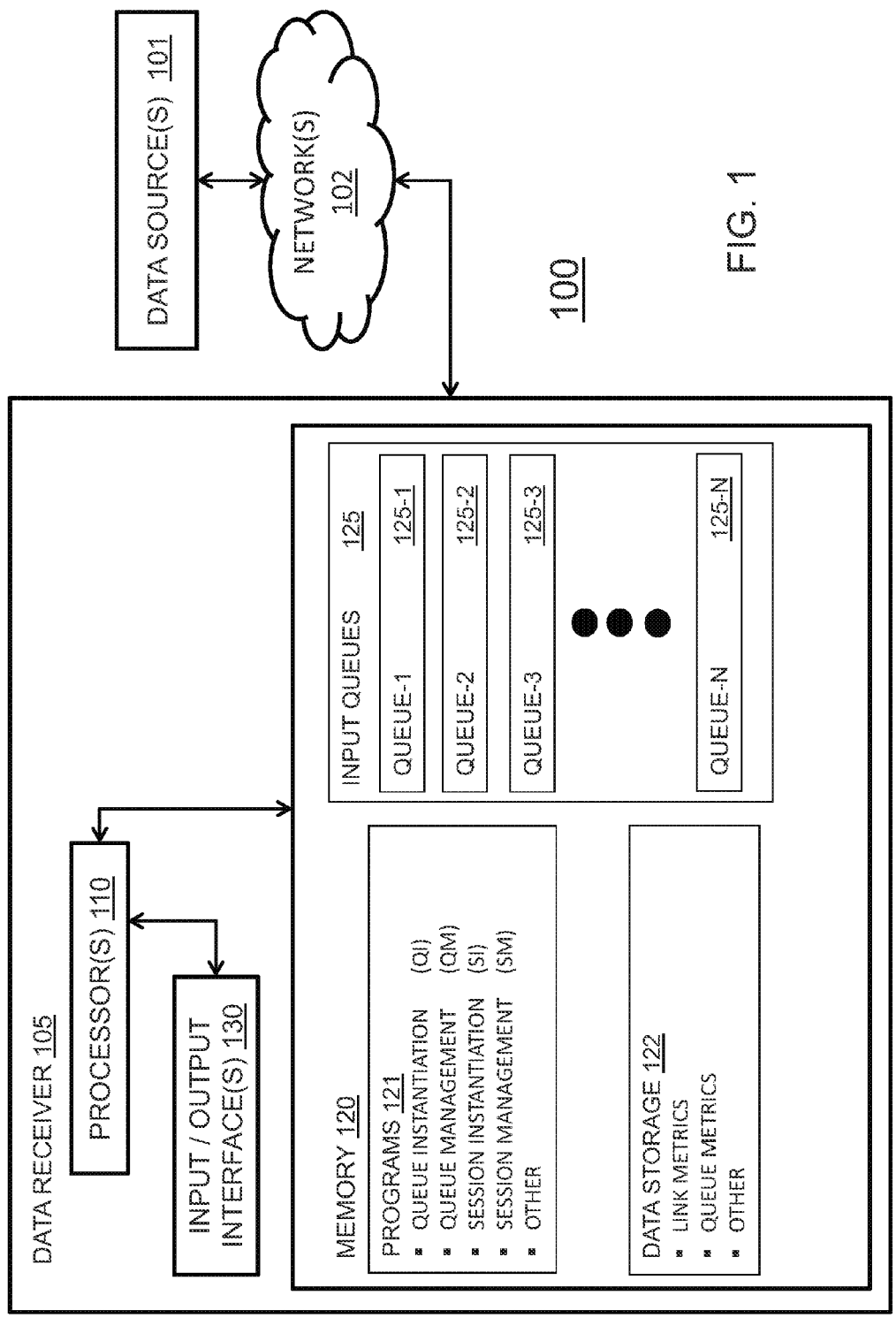
FIG. 1 depicts a high-level block diagram of a simplified system utilizing flow control in accordance with the various embodiments.

FIG. 1 depicts a high-level block diagram of a simplified system utilizing flow control in accordance with the various embodiments. In particular, FIG. 1 is primarily directed toward illustrating data receiver processing functions associated with the various embodiments. It is noted that the data receiver processing functions discussed herein may be utilized within the context of any data receiving element benefiting from the various flow control embodiments discussed herein, such as the eNodeBs 111, SGWs 112, PGW 113 and so on discussed above with respect to FIG. 1.

As depicted in FIG. 1, exemplary system 100 includes a data source 101 providing a plurality of packet or traffic flows to a data receiver 105 via one or more networks 102. The data receiver 105 may comprise a functional element or portion of a larger network entity (not shown), such as a data receiver module within a base station, eNodeB, router or other network entity receiving data packets or traffic flows.

As depicted in FIG. 1, the data receiver 105 includes one or more processors 110, a memory 120, and input-output (I/O) interface(s) 130. The processor 110 is coupled to each of memory 120, and I/O interfaces 130.

The I/O interfaces 130 may be used to couple the data receiver 105 and other functional elements or modules within a network element having one or more data receiver portions such as described herein with respect to FIG. 1 (e.g., router input-output modules and the like). The I/O interfaces 130 include networking and/or communications capability suitable for communicating with the data source 101 via the one or more networks 102. It will be appreciated that fewer or more, as well as different, interfaces may be supported. For example, the networks 102 may comprise multiple network technologies.

The processor 110 is configured for controlling the data receiver 105 to provide the various inspection, estimation, validation update and related functions as described herein.

The memory 120 is depicted as including programs 121, data 122 and a plurality of input queues 125-1 through 125-N (collectively input queues 125). While memory 120 is depicted as a singular memory element storing programs 121, data 122 and input queues 125, it will be appreciated by those skilled in the art that memory 120 may be comprised of multiple memory elements or portions thereof, as well as multiple types of memory including static memory, dynamic memory, mass storage devices, local memory, remote memory and the like.

Stored programs 121 may include one or more of a queue instantiation program (QI), a queue management program (QM), a session instantiation program (SI), a session management program (SM) as well as other programs (not shown).

The session instantiation program (SI) and session management program (SM are generally used to set up, tear down and otherwise manage application sessions wherein one or more data flows may be provided to the data receiver 105 from the data source 101. These programs are understood by those skilled in the art and they will not be described in significant detail herein.

The queue instantiation program (QI) is adapted to instantiate a new queue to support a new traffic flow from, illustratively, the data source 101. Similarly, the queue management program (QM) is adapted to manage newly instantiated as well as existing traffic flows. The operation of the queue instantiation program (QI) and queue management program (QM) will be described together in more detail below with respect to FIGS. 3-7.

Data storage 122 may include one or more of link metrics, queue metrics, application metrics as well as other data.

Link metrics generally comprise information useful in characterizing one or more data links, network paths and the like that convey traffic flows to the data receiver 105. Within the context of the present embodiments, one or more link delay parameters D associated with the network links conveying data to the data received 105 is of interest. A link delay parameter D may be defined in terms of the total or aggregate traffic flows received, in terms of individual traffic flows, or any combination thereof. Moreover, the link delay parameter D may be defined using any of a minimum delay, maximum delay, average delay or other delay-related metric, which delay-related metric may change depending upon the time of day, the network links deployed to carry traffic flows and so on. The link delay parameter D may be based upon a characterization or estimate of the path, periodic measurements of the links and so on.

Queue metrics generally comprise information useful in characterizing the utilization level, size, drain rate, fill rate and/or other parameters associated with the input queues 125.

As depicted herein, the networks 102 may comprise one or more of WiFi or WiMAX networks (e.g., 802.11x and the like), 3G and/or 4G mobile networks, and/or wired or wireless local area networks (such as Ethernet, Gigabit Ethernet and the like) for supporting data/services signaling between the data receiver 105 and data source 101. It will be appreciated that fewer or more, as well as different, input-output or communications interfaces may be supported.

Although primarily depicted and described as having specific types and arrangements of components, it will be appreciated that any other suitable types and/or arrangements of components may be used for data receiver 100.

For purposes of this discussion, it will be assumed that the data source 201 comprises a FGW, the network 202 comprises a very large long term evolution (LTE) link characterized by a significant link delay D, and the data receiver 205 comprises an eNodeB or base station communicate with a plurality of mobile devices (not shown), where many of the mobile devices are associated with one or more traffic flows.

At the data receiver 205, such as a base station or eNodeB, each queue i that exists has a max queue size of Qi packets and a service rate Ri packets per second. In various embodiments, the per-flow queues are allocated a specific amount of memory. In various embodiments, the amount of memory allocated is adapted based upon criteria such as priority, service level agreement (SLA) requirements, total utilization of memory and so on.

In an aggregate per-flow queue management embodiment, the per-flow queues do not have individual maximum size limits; rather, a cumulative size limit Q is imposed by memory availability and the like. In this embodiment, the individual flows are not the primary drivers associated with queue flow control; rather, flow control is managed at an aggregate flow level in that for a maximum queue size Q, and aggregate drain rate R, some or all of the flows are turned on and off contemporaneously. In this manner, a single flow control message is used to control traffic flow across all queues. Thus, the various embodiments described herein may be adapted to provide for an aggregation of some or all of the active or managed queues in which a cumulative or aggregated size limit Qa a cumulative or aggregated service rate Ra are used to determine common first times at which FlowON messages are transmitted and second times at which FlowOFF messages are transmitted to avoid, respectively, queue underflow and overflow conditions.

To start packet transmission to the queue i from a data source 201, such as a PGW, a FlowON message is transmitted to the PGW from the BS. A FlowON message transmitted at a time t1 will reach the PGW at a time t1+D. The PGW will responsively begin transmitting packets toward the BS, the first of such packets arriving at the BS at a time t1+2D, and at a link bandwidth rate of B packets/second. To stop packet transmission to the queue i, a FlowOFF message is transmitted to the PGW from the BS. The FlowOFF message should be transmitted by the BS at a time within Qi/B of the FlowON message (i.e., at t2=t1+Qi/B). When the FlowOFF message reaches the PGW at t2+D, the PGW responsively stops transmitting packets toward the BS. The time difference between (t2+D) and (t1+D) is Qi/B, which is sufficient to fill the active queue without any losses.

While the above-described ON-OFF processing works well for a single per-flow queue, within a multiple per-flow queue system there are several system issues that prevent a simple delay-to-credit mapping being applied as a quick-fix, such one or more of overlapping ON-OFF signals for different per-flow queues, variable number of active queues, variable service rates of per-flow queues and so on.

Figure 2:
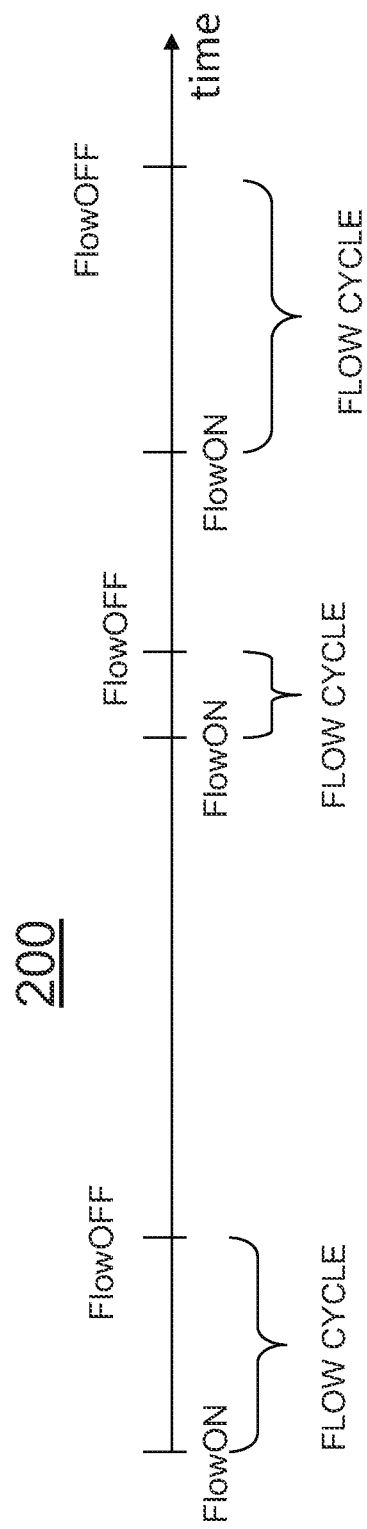
FIG. 2 depicts a graphical representation of flow cycles useful in understanding the present invention.

FIG. 2 depicts a graphical representation of flow cycles useful in understanding the present invention. Specifically, a timeline 200 graphically depicts multiple flow cycles of differing durations, where each flow cycle is defined as a time between the transmission of a FlowON message and corresponding FlowOFF message. Various embodiments adapt flow cycle duration associated with one or more per-flow queues to accommodate differences in available bandwidth, link delay, service rates and so on.

Various examples will now be discussed within the context of an LTE network in which a PGW transmits data packets to the base station (eNodeB). The following assumptions are made:

1. Control traffic, i.e., FlowON and FlowOFF messages are given the highest priority and are processed without any delay by both BS and PGW;
2. The PGW serves multiple requests for active queues in round-robin order, weighted round-robin order or according to some other "fairness" distributed servicing scheme;
3. Control messages are never lost; and
4. The drainage rate of an active queue at the BS does not change within the duration of a FlowON-FlowOFF cycle.

The first assumption is already present in existing systems. The round-robin order associated with the second assumption is already present in some systems. Various embodiments employ weighted round-robin, prioritized round-robin or other fairness control mechanisms, which mechanisms may be adapted to preferentially favor certain traffic flows, customers and so on, such as within the context of differentiated quality of service (QoS) embodiments. It is noted that fairness algorithms or skewed/weighted fairness algorithms use within the context of priority queue-schedulers in the various embodiments. Given a condition where the scheduling scheme utilized at the PGW is known, various embodiments may be modified to accommodate scheduling scheme and thereby optimize individual and or aggregate per-flow queue performance.

The third assumption contemplates that no additional flow control messages are generated. The fourth assumption is a valid one since the FlowON-FlowOFF cycle is very fast (time needed to fill a very small buffer). It is noted that even if the fourth assumption is not met, various embodiments adapt to drainage rate changes by reducing the max queue size, Qi, by a small margin to account for this difference. This adaptation is of the order of few packets, typically ten packets or less. In various other embodiments, this margin is set to zero. In these embodiments, even if the queue drainage rate is also zero, the worst-case scenario is an under-utilization of the queue but never a packet loss.

Figure 3:
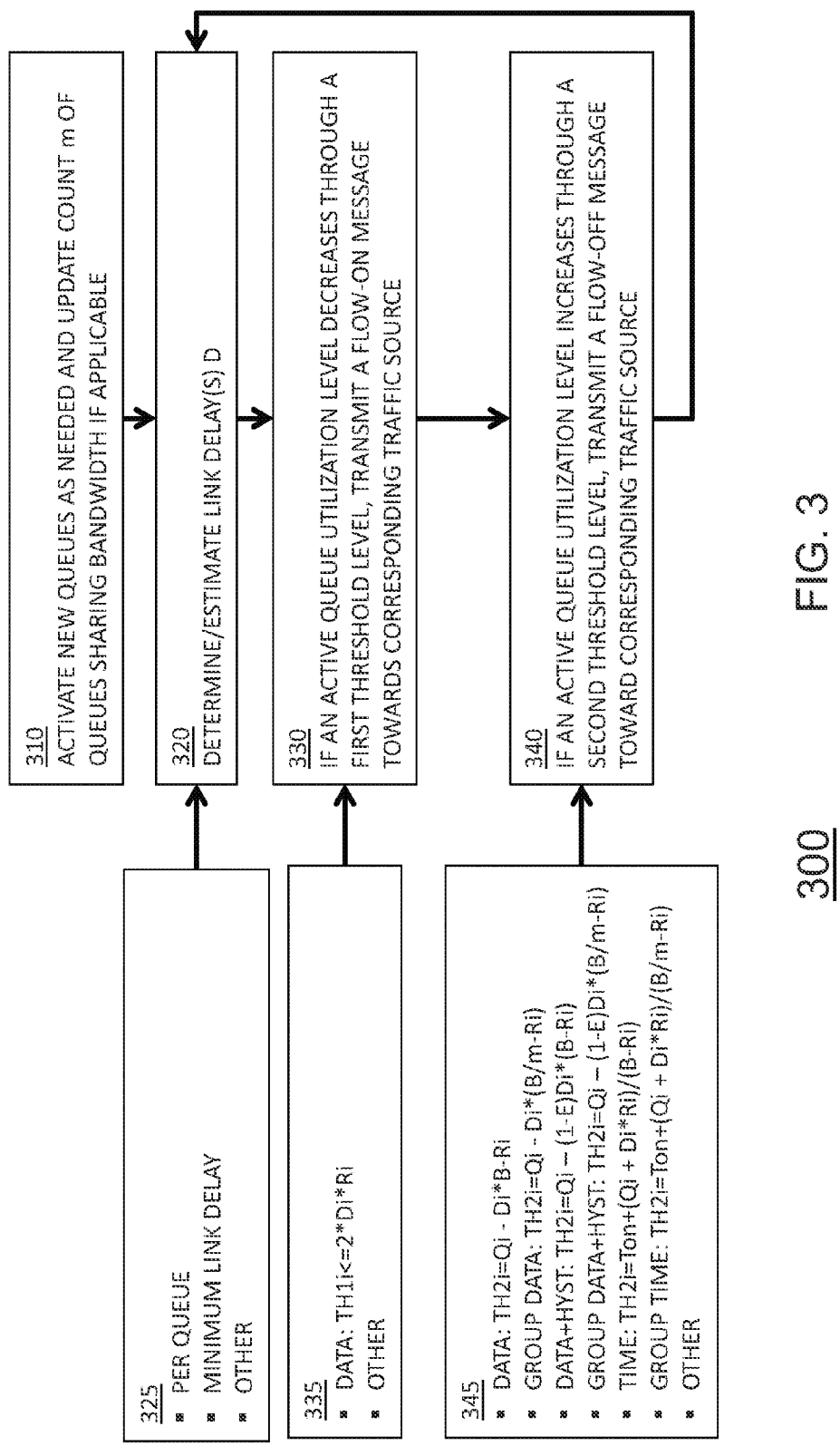

FIG. 3 depicts a flow diagram of a method according to one embodiment. Specifically, the method 300 of FIG. 3 is suitable for use within, illustratively, the data receiver 105 discussed above with respect to FIG. 1.

At step 310, one or more new per-flow queues are activated as needed and, if applicable, a count 'm' is updated to represent the activated number of queues sharing bandwidth of a common link (e.g., a common data link between a PGW and BS). For example, one or more new per-flow queues may be activated in response to a newly instantiated session for audiovisual streaming, voice, application data or the like by a mobile device operatively coupled to a base station or eNodeB.

At step 320, a determination or estimate is made of the link delay D associated with at least the newly activated one or more per-flow queues. Referring to box 325, the link delay D may comprise a per-queue instantaneous or measured link delay Di, a per-queue calculated minimum link delay Di, and average link delay or minimum link delay, an aggregated link delay and the like.

At step 330, for any active queue if a corresponding utilization level decreases through a first threshold level TH1i, then a FlowON message is transmitted toward the corresponding data traffic source.

Referring to box 335, the first threshold level TH1i may be defined in terms of the amount of data that will drain from the queue during the time it takes for additional data to be transmitted by the data source and received at the queue. For example, an amount of data less than or equal to twice the link delay Di associated with the queue multiplied by the drain rate Ri of the queue.

At step 340, for an active queue if a corresponding utilization level increases through a second threshold level TH2i, then a FlowOFF message is transmitted toward the corresponding data traffic source.

Referring to box 345, the second threshold level TH2i may be defined in terms of the amount of data that will be received at the queue during the time it takes for the queue to stop receiving data after the FlowOFF message causes the data source to stop transmitting data.

For a queue consuming all of the link bandwidth, this threshold amount of data may be calculated as:

$$TH2i = Qi - Di*(B - Ri) \qquad \text{(equation 1)}$$

For a queue consuming a proportionate share of the link bandwidth where m queues share the link bandwidth, this threshold amount of data may be calculated as:

$$TH2i = Qi - Di*(B/m - Ri) \qquad \text{(equation 2)}$$

In various embodiments, a hysteresis value E (less than 1) is built into the calculation associated with the second threshold level TH2i as follows:

$$TH2i = Qi - (1-E)Di*(B - Ri); \qquad \text{(equation 3)}$$

$$TH2i = Qi - (1-E)Di*(B/m - Ri) \qquad \text{(equation 4)}$$

The second threshold level TH2i may be defined in terms of the amount of time it takes for the queue to stop receiving data after the FlowOFF message causes the data source to stop transmitting data. For a queue consuming all of the link bandwidth, this threshold amount of time may be calculated as:

$$TH2i = Ton + (Qi + Di*Ri)/(B-Ri) \quad \text{(equation 5)}$$

In various embodiments, a hysteresis value E (less than 1) is built into the calculation associated with the second threshold level TH2i as follows:

$$TH2i = Ton + (Qi + Di*Ri)/(B/m-Ri) \quad \text{(equation 6)}$$

Consider a set of N active per-flow queues, each being drained at rate Ri, with a maximum size of Qi packets. A subset of these N queues (denoted as primary queues) initiates a flow cycle, which is defined in various embodiments as a tuple of FlowON and a FlowOFF messages. Since these primary queues are sharing the bandwidth of the PGW-BS link, it cannot be assumed that all the bandwidth is given to each queue, one at a time in sequence. This will affect system performance for the under-loaded active queues. In various embodiments, a Round-Robin scheduling at the PGW is implemented to send packets to these primary queues. Therefore, the timing of the FlowOFF message for each primary queue is calculated based on the number of primary queues. It is noted that the number of primary queues might change dynamically during the duration of a flow cycle for a single primary queue.

For an active queue at the BS, it takes 2*D seconds from the time of sending a FlowON message to actually receive a packet from the PGW. Therefore, the queue has to send the FlowON message when there are at least 2*D*Ri packets in its queue to prevent under-utilization of the queue. This is the ON threshold for any queue i in the system.

Given M primary queues, each primary queue is served by the PGW at a rate of B/M packets/second. Therefore, when any new primary queue i is scheduled to send a FlowOFF message seconds after the current time instant (when it sends the FlowON message), new primary queue i will need a peak buffer space of −D*Ri+(t−D)(B/M−Ri)+D(B/M−Ri). The first term is for the queue drain during the delay in getting the FlowON to the PGW. The second term is the net drain rate during the remaining (t−D) seconds. The third term is the number of packets added to the queue after the FlowOFF message is sent and until the PGW receives it. Together, we get a peak buffer space of (B/M−Ri)·t−D*Ri=Qi, where Qi is the number of empty packet (slots) in the queue at the time of sending the FlowON message. Therefore, t=(Qi+D*Ri)/(B/M−Ri).

Thus, when the primary queue sends a FlowON message at time t1, it sets its OFF timer to go off at t1+t, where t is given by the above equation.

At the time of sending a FlowOFF message, in order to avoid packet loss, a primary queue should not have more than Qi−D*(B/M−Ri) packets in the queue, where Qi is the maximum number of packets that can be stored in the per-flow queue. In order to avoid packet loss due to timing issues, we will allow for a small hysteresis value, E, and set Q'i=(1−E)*Qi. The value of E is between 0 and 1. One practical value of the hysteresis function E identified by the inventor is the value of 0.05. Therefore, as long as the primary queue holds less than Q'i−D*(B/M−Ri) packets, there is no need to send a FlowOFF message.

The above discussion is valid when the set of primary queues does not change during the flow cycle of any given primary queue. However, flows join and leave in the interim, and as a result the OFF timers of primary queues needs to be updated. Various embodiments therefore use an update procedure, such as one based on the number of empty packet slots at each primary queue. In this case, during the update of control signals are sent to the PGW and, therefore, the peak buffer space is given by t*(B/M−Ri)+D(B/M−Ri)=Qi.

Thus, the revised OFF time is set to Qi/(B/M−Ri)−D seconds from the current time. For the scenario when the PGW runs out of packets to send, various embodiments contemplate that the PGW will put the queue in and idle/sleep mode with a corresponding control message to the BS, which control message will trigger the BS to update the OFF timers.

FIG. 4 depicts a flow diagram of a method according to one embodiment. Specifically, FIG. 4 depicts a flow diagram of a method 400 in which a number N of active per-flow queues are processed at a base station BS. In addition, a hysteresis factor E is set equal to, illustratively 0.95. The method 400 of FIG. 4 processes each per-flow queue substantially in accordance with the method 300 of FIG. 3 wherein each active per-flow queue is part of a set of queues M sharing the bandwidth of a common link, and the second threshold level (to transmit a FlowOFF message) is defined in terms of the amount of time it takes for the queue to stop receiving data after the FlowOFF message causes the data source to stop transmitting data.

Referring to FIG. 4, the method 400 as implemented contemplates that each queue i is associated with a respective timer, which timer is set according to an amount of time for a FlowOFF_i transmission after a FlowON_i transmission (e.g., a flow cycle). Specifically, within the method 400 of FIG. 4, it is noted that:

1. Each primary queue is represented exactly once in an OFF_times list;
2. There are three types of events that trigger the execution of the algorithm: (a) a timer expires in the OFF_times list; (b) an active queue size falls below the ON threshold; and (c) the PGW closes a PDP context (i.e., puts the queue in sleep/idle mode) because it has no packets for a specific queue in its buffer; and
3. The number of flow control messages generated per flow cycle is exactly 2, which is identical to (or better than) the behavior in current systems.

FIG. 5 depicts a flow diagram of a method according to one embodiment. The method 500 of FIG. 5 is particularly useful in the case where timer functions in the data receiver are unavailable or constrained in some manner. The method 500 of FIG. 5 utilizes a data-based threshold mechanism to provide a functionality similar to the time-based threshold mechanism discussed above with respect to FIG. 4.

Specifically, FIG. 5 depicts a flow diagram of a method 500 in which a number N of active per-flow queues are processed at a base station BS. In addition, a hysteresis factor E is set equal to, illustratively 0.05. Generally speaking, the various embodiments describe herein utilize a hysteresis parameter of approximately 0.05 up TO 0.95.

The method 500 of FIG. 5 processes each per-flow queue substantially in accordance with the method 300 of FIG. 3 wherein each active per-flow queue is part of a set of queues M sharing the bandwidth of a common link, and the second threshold level (to transmit a FlowOFF message) is defined in terms of the amount of data the queue can additionally hold after the FlowOFF message causes the data source to stop transmitting data.

Referring to FIG. 5, the method 500 as implemented contemplates that each queue is associated with a respective size parameter, which defines the amount of additional data able to be stored in the queue before a FlowOFF_i transmission stops data transmission after a FlowON_i starts data transmission (e.g., a flow cycle).

A drawback of the method 500 of FIG. 5 (as compared with the method 400 of FIG. 4) is that BS has to constantly keep checking each queue to see if its corresponding OFF threshold has been reached, as well as constantly changing the thresholds for all primary queues for each change in the primary queue set.

By contrast, the method 400 of FIG. 4 contemplates that the OFF thresholds are re-computed only upon timer expiry for that particular queue. Re-computing timers often, on the other hand is not a problem, since it does not incur memory access penalties that happens while comparing buffer sizes.

FIG. 6 depicts a high-level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a packet processing module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 600 depicted in FIG. 6 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

The various embodiments discussed above advantageously enable implementation of relatively small per-flow buffer memories at data receivers such as base stations, eNodeBs, routers and the like, regardless of the link delays and the bandwidth of the link between the data source (e.g., PGW) and data receiver (e.g., BS). Within the context of a base station or eNodeB, the use of very small buffer memories helps minimize handoff losses, rapidly respond to changing user conditions, reduces buffer memory costs, and reduces power consumption.

Various embodiments contemplate a method, system, apparatus, computer readable medium, computer program product and the like which operates to control, either individually or in the aggregate, traffic flows associated with a plurality of queues by transmitting traffic source FlowON messages at first times selected to avoid queue underflow conditions, and traffic source FlowOFF message at second times selected to avoid queue overflow conditions, where the first and second times are determined as a function of delay time D of a link supporting the traffic source.

Although various embodiments which incorporate the teachings of the present invention have been shown and described in detail herein, those skilled in the art can readily devise many other varied embodiments that still incorporate these teachings.

What is claimed is:

1. A method for controlling traffic flows associated with a plurality of active queues, the method comprising:
for each active queue, transmitting toward a corresponding traffic source a FlowON message at first times selected to avoid a queue underflow condition;
for each active queue, transmitting toward said corresponding traffic source a FlowOFF message at second times selected to avoid a queue overflow condition;
said first and second times being determined as a function of delay time D of a link between said each active queue and said corresponding traffic source,
wherein time intervals between transmissions of any two messages out of a plurality of FlowON and FlowOFF messages is varied, said plurality of FlowON and FlowOFF messages being an integer of at least more than two and including said FlowON message and said FlowOFF message.

2. The method of claim 1, wherein said first times are identified as said each active queue exhibiting a utilization level decreasing through a first threshold level.

3. The method of claim 2, wherein the first threshold level is set to a queue utilization level at which a time to drain the remaining packets in the queue is approximately equal to a further time to begin receiving additional packets after transmission of the FlowON message.

4. The method of claim 1, wherein said second times are identified as said each active queue exhibiting a utilization level increasing through a second threshold level.

5. The method of claim 4, wherein the second threshold level is set to a queue utilization level at which a time to fill the queue with packets being received is approximately equal to a further time to stop receiving additional packets after transmission of the FlowOFF message.

6. The method of claim 1, wherein said second times are identified as a time after transmitting the FlowON message increasing through a second threshold level.

7. The method of claim 1, wherein:
the FlowON message is adapted to cause said corresponding traffic source to transmit packets towards said each active queue; and
the FlowOFF message is adapted to cause said corresponding traffic source to stop transmit packets towards said each active queue.

8. The method of claim 1, wherein the first and second threshold levels associated with a queue i are determined using a queue size parameter $Q_i$, a queue service rate parameter $R_i$, a link bandwidth parameter $B_i$ and a link delay parameter $D_i$.

9. The method of claim 1, wherein each of the plurality of active queues is included within a set of active queues M receiving packets via a link having a delay time D and a bandwidth B, the method further comprising adapting said first and second times for said each active queue in accordance with a respective allocation of a link bandwidth B.

10. The method of claim 9, wherein each of the plurality of active queues is allocated a proportionate share of the link bandwidth B.

11. The method of claim 9, wherein one or more of the plurality of active queues is allocated a disproportionate share of the link bandwidth B.

12. The method of claim 9, wherein the set of active queues M only includes active queues exhibiting at least a minimum utilization level.

13. The method of claim 1, wherein a hysteresis parameter E is used to adapt said second times.

14. The method of claim 1, further comprising:
logically representing at least a portion of said plurality of said active queues as an aggregate queue in which each member queue contemporaneously transmits said FlowON and FlowOFF messages.

15. A method for controlling traffic flows associated with a plurality of active queues, the method comprising:
for each active queue, transmitting toward a corresponding traffic source a FlowON message at first times selected to avoid a queue underflow condition;
for each active queue, transmitting toward said corresponding traffic source a FlowOFF message at second times selected to avoid a queue overflow condition;
said first and second times being determined as a function of delay time D of a link between said each active queue and said corresponding traffic source,
wherein said first times are identified as said each active queue exhibiting a utilization level decreasing through a first threshold level,
wherein the first threshold level is set to a queue utilization level at which a time to drain the remaining packets in the queue is approximately equal to a further time to begin receiving additional packets after transmission of the FlowON message,
wherein the first threshold level comprises a remaining amount of data within the queue calculated as a queue service rate parameter Ri multiplied by twice a link delay.

16. A method for controlling traffic flows associated with a plurality of active queues, the method comprising:
for each active queue, transmitting toward a corresponding traffic source a FlowON message at first times selected to avoid a queue underflow condition;
for each active queue, transmitting toward said corresponding traffic source a FlowOFF message at second times selected to avoid a queue overflow condition;
said first and second times being determined as a function of a delay time D of a link between said each active queue and said corresponding traffic source,
wherein each of the plurality of active queues has a drainage rate Ri and is associated with a respective timer for determining a time between said first times and said second times, the method further comprising:
for said each active queue, starting said respective timer in response to transmitting said FlowON message, said respective timer having a stop time determined as a function of the delay time D of the link and the drainage rate Ri of said each active queue.

17. A method for controlling traffic flows associated with a plurality of active queues, the method comprising:
for each active queue, transmitting toward a corresponding traffic source a FlowON message at first times selected to avoid a queue underflow condition;
for each active queue, transmitting toward said corresponding traffic source a FlowOFF message at second times selected to avoid a queue overflow condition; and
logically representing at least a portion of said plurality of said active queues as an aggregate queue in which each member queue contemporaneously transmits said FlowON and FlowOFF messages,
said first and second times being determined as a function of a delay time D of a link between said each active queue and said corresponding traffic source,
wherein contemporaneous first and second times for said each active queue are determined using an aggregated queue size parameter Qa, an aggregated queue service rate parameter Ra, a link bandwidth parameter B and a link delay parameter D.

18. A non-transitory computer readable medium including software instructions which, when executed by a processor, performs a method for controlling traffic flows associated with a plurality of active queues, the method comprising:
for each active queue, transmitting toward a corresponding traffic source a FlowON message at first times selected to avoid a queue underflow condition;
for each active queue, transmitting toward said corresponding traffic source a FlowOFF message at second times selected to avoid a queue overflow condition;
said first and second times being determined as a function of delay time D of a link between said eachg active queue and said corresponding traffic source,
wherein time intervals between transmissions of any two messages out of a plurality of FlowON and FlowOFF messages is varied, said plurality of FlowON and FlowOFF messages being an integer of at least more than two and including said FlowON message and said FlowOFF message.

19. A computer program product, wherein a computer is operative to process software instructions which adapt the operation of the computer such that computer performs a method for controlling traffic flows associated with a plurality of active queues, the method comprising:
for each active queue, transmitting toward a corresponding traffic source a FlowON message at first times selected to avoid a queue underflow condition;
for each active queue, transmitting toward said corresponding traffic source a FlowOFF message at second times selected to avoid a queue overflow condition;
said first and second times being determined as a function of delay time D of a link between said each active queue and said corresponding traffic source,
wherein time intervals between transmissions of any two messages out of a plurality of FlowON and FlowOFF messages is varied, said plurality of FlowON and FlowOFF messages being an integer of at least more than two and including said FlowON message and said FlowOFF message.

* * * * *